United States Patent [19]
Abe et al.

[11] 3,956,450
[45] May 11, 1976

[54] BINDING STRAP, AND PROCESS FOR MANUFACTURING SAME

[75] Inventors: Morio Abe, Tokyo; Masaaki Kaji, Chofu, both of Japan

[73] Assignee: Dainippon Ink and Chemicals, Incorporated, Tokyo, Japan

[22] Filed: Apr. 4, 1972

[21] Appl. No.: 241,018

[30] Foreign Application Priority Data
July 19, 1971 Japan.............................. 46-53119

[52] U.S. Cl.............................. 264/210 R; 264/284
[51] Int. Cl.² .......................................... B29D 15/00
[58] Field of Search............................ 264/284, 210

[56] References Cited
UNITED STATES PATENTS

| | | | |
|---|---|---|---|
| 2,957,780 | 10/1960 | Stephens | 264/284 X |
| 3,060,515 | 10/1962 | Corbett | 264/284 |
| 3,283,378 | 11/1966 | Cramton | 264/210 |
| 3,387,077 | 6/1968 | Sammons | 264/210 |
| 3,502,765 | 3/1970 | Spencer | 264/284 X |
| 3,582,453 | 6/1971 | Sloan | 264/284 X |
| 3,635,609 | 1/1972 | Balamuth | 264/23 X |

*Primary Examiner*—Richard R. Kucia
*Attorney, Agent, or Firm*—Sherman & Shalloway

[57] ABSTRACT

A binding strap manufactured by the embossment of a relatively narrow and flat band obtained by the extrusion molding of a starting material consisting predominantly of a thermoplastic synthetic resin having good crystal orientating tendency followed by stretching the so extruded band to a high degree in the extrusion direction, wherein there are present at both the front and back sides of said strap two sets of a multiplicity of parallel grooves, said two sets of grooves obliquely intersecting each other; said grooves at the front and back sides being in register; the state of crystal orientation in the extrusion direction in the grooved portions, which are distributed reticulately over the whole of the strap, being substantially reduced as compared with the other portions.

1 Claim, 4 Drawing Figures

BINDING STRAP, AND PROCESS FOR MANUFACTURING SAME

This invention relates to a binding strap and a process for manufacturing same. More specifically, the invention relates to a binding strap and a process for the manufacture of same, wherein in a binding strap manufactured by the embossed of a relatively narrow and flat band obtained by the extrusion molding of a starting material consisting predominantly of a thermoplastic synthetic resin having good crystal orientating tendency such, for example, as polypropylene or high density polyethylene, followed by stretching the so obtained band to a high degree in the extrusion direction, there are present at both the front and back sides of the strap two sets of parallel grooves obliquely intersecting each other, with the grooves at the front and back sides being in register, characterized in that at said grooved portion distributed reticulately over the whole of the strap the state of crystal orientation in the extrusion direction is substantially reduced as compared with the other portions.

As this type of binding strap, that disclosed in Japanese Pat. Publication No. 15720/65 has been known in the past. The strap as disclosed in this patent is characterized in that the strap as a whole is stretched to a high degree in the longitudinal direction, i.e., the extrusion direction, and over the whole surface of the strap are scatteringly present small concave portions at small intervals, at which concave portions there is caused to be a disarrangement of the micellar orientation in the transverse direction. And as the method of manufacturing a strap of this kind, the aforesaid patent specification discloses a procedure which comprises stretching an extrusion-molded band to a high degree in the longitudinal direction, then pressing the drawn band between a pair of concavo-convex rolls engraved with a multiplicity of convex portions scattered at small intervals over the surface of the rolls to form the concave portions on the band and cause disarrangement of the micellar orientation at such portions. Further, this patent specification mentions as an advantage of this strap that it is not as easily susceptible to longitudinal splits as in the case with the simple stretched straps not having such concave portions. It also claims an increase in the frictional resistance of the surface as well as an enhanced pliability of such a strap.

There are a variety of other straps of this kind that are commercially available besides that described hereinabove. These straps are known to be manufactured in the same manner, i.e., by stretching an extrusion-molded band to a high degree in the machine direction, and thereafter pressing the stretched band between a pair of concavo-convex rolls engraved with a multiplicity of convex portions scatteringly present at the surface of the rolls at small intervals. It is not necessarily clear that these straps have been disarranged in their micellar orientation in the transverse direction as in the case with the strap of the hereinbefore described patent. However, since these straps have been manufactured by pressing with the tips of the small projections of concavo-convex rolls a band which has been rendered readily susceptible to longitudinal splitting as a result of having been subjected to a thorough stretching treatment, a great number of minute cracks are formed in the vicinity of the points of pressure. Hence, it can be seen that the band, as a whole, presents a soft and pliable appearance resulting from having been rubbed and pressed, as compared with its appearance before the compression treatment. In consequence, it is also seen that when the strap is pinched and folded longitudinally, it is folded over pliantly with the stress being dispersed and hence the cracks do not concentrate along a single line. This stress dispersion effect due to the presence of minute cracks in the vicinity of the points of pressure is noted far more conspicuously than the longitudinal split resistance effect that is said to be based on the disarrangement of the orientation -- the actual presence or absence of which is not clear.

These conventional straps, to be sure, seemingly have satisfactory resistance to longitudinal splitting when tested by means of the above described test in which the straps is pinched between the thumb and finger. However, in their state of actual use, such as where they are securely wrapped about a crated package to accomplish the heavy duty packing by means of a strong force using a packaging machine, troubles were frequently experienced in that in these conventional straps longitudinal splits would occur when tension was applied. Again, when the thin band was passed between the pair of rolls in the conventional apparatus for manufacturing the binding strap, it frequently happened that the pressure points at the front and back sides of the band were not in register. This happens because the convex portions of the conventional pressure rolls are arranged at random, and thus the convex portions of the pair of rolls do not readily meet exactly vis-a-vis but rather in a state like that of gears in engagement with the band interposed therebetween. On the other hand, in the case where the band is thick, or the case where the degree of projection of the convex portions of the rolls is small, or the case where the convex portions of the pair of rolls are differently arranged on the two rolls, there was a tendency for slippage to occurring between the rolls and the band. In consequence, the pressure points were formed nonuniformly on the surface of the band, when the conventional apparatus was used, to cause irregularities in strength as well as thickness, and hence only a binding strap of low quality could be obtained. Therefore, there was a desire that the conventional binding straps be improved in many respects.

An object of the present invention is to provide a binding strap which does not have the shortcomings such as above indicated, and a process for manufacturing such a strap.

Another object of the invention resides in making further improvements in the technique disclosed in the aforesaid Japanese patent specification and thus establish an effective as well as reliable technique.

The accompanying drawings illustrate an embodiment of the present invention.

Figure 1:
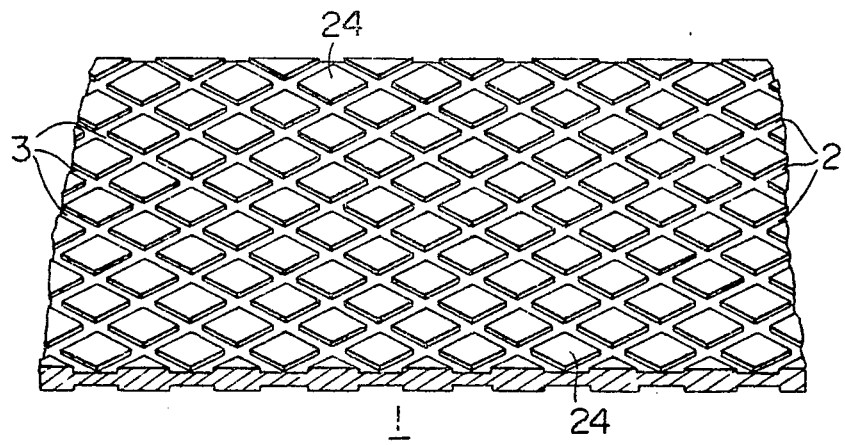
FIG. 1 is a partial perspective view on a magnified scale of the front side (or back side) of the binding strap of the invention.
Figure 2:
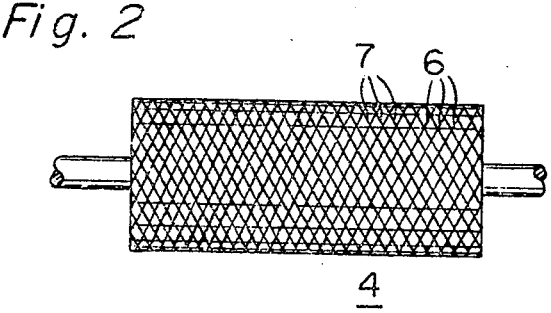
FIG. 2 is a plan view of a pressure roll used for making the foregoing strap.
Figure 3:
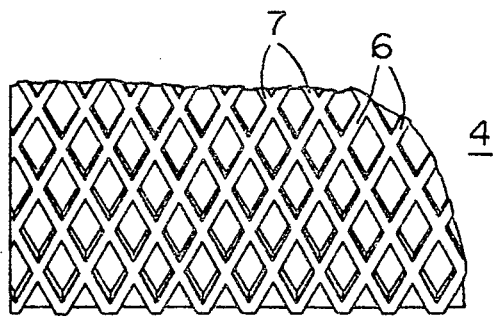
FIG. 3 is a partial view on a magnified scale of FIG. 2.
Figure 4:
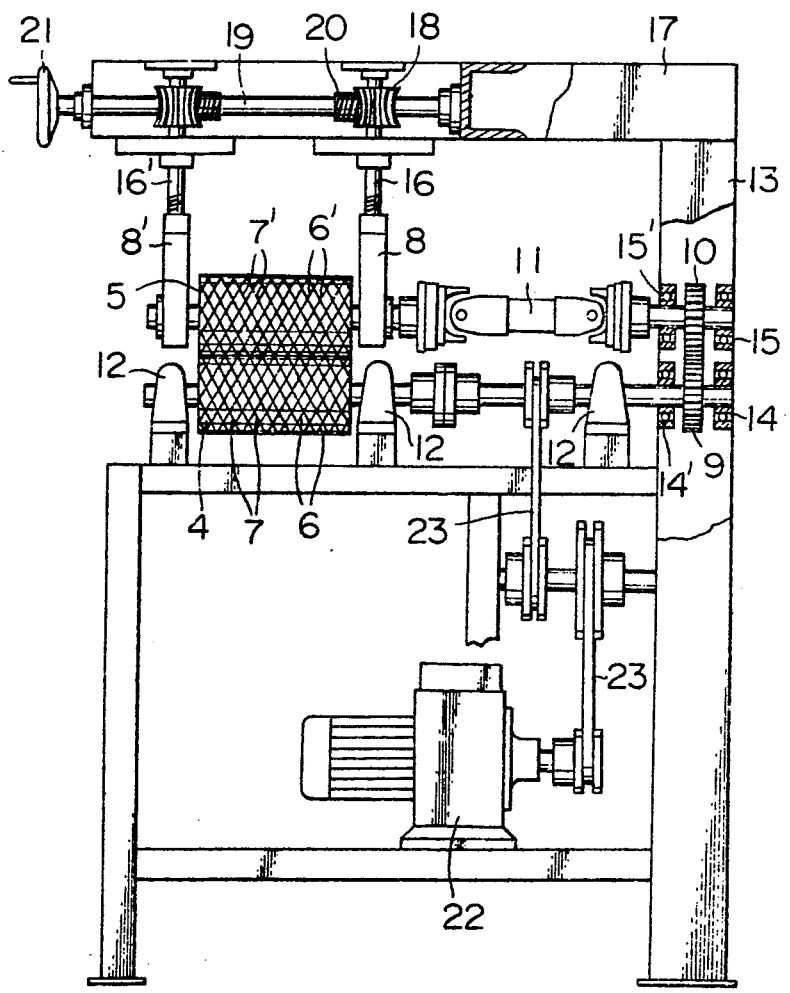
FIG. 4 is a front elevation partially in section of the compression apparatus for making the foregoing strap.

A new and advantageous binding strap is provided by the present invention as a result of the addition of the following characteristic conditions to a binding strap manufactured by the embossment of a relatively narrow and flat band obtained by the extrusion molding of a starting material consisting predominantly of a thermoplastic resin having good crystal orientating tendency followed by stretching the so obtained band to a high degree in the extrusion direction. The conditions include the following four points:

a. The absence of minute cracks dispersed over the whole of strap 1;

b. The presence at both the front and back sides of the strap 1 of a multiplicity of parallel grooves 2 and a multiplicity of parallel grooves 3, which two sets of grooves obliquely intersect each other;

c. The grooves 2, 3 at the front side and the grooves 2, 3 at the back side are in register as shown in FIG. 1; and d. There is a substantial decrease in the state of the crystal orientation in the extrusion direction at the grooved portions 2 and 3, i.e., at the grooved portions 2 and 3 which are distributed reticulately over the whole of the strap.

The binding strap of the present invention, which has been produced in this manner, is reticulately strengthened over the whole of the strap in this fashion and, in addition, does not possess any minute cracks. Hence, it is stiffer than the conventional straps which have been made from an equal amount of the same material, with the consequence that it is especially suitable for use in the mechanical packaging of heavy packages as in the case with conventional steel bands. Further, binding the case of the strap of the present invention the uncompressed portions from positive convex portions 24, and hence the apparent thickness of the strap is greater and, in addition, the slippage prevention effect is especially great. Further, the spottiness in the quality of the binding strap of the present invention is less than that of the conventional straps. In addition, since the grooves at the front and back sides of the invention strap are in register, the strap does not become wavy in its longitudinal direction as in the case with the conventional straps. Consequently, even when the strap is left to stand in a tensioned state, there is no stretching out of the waves. Thus, the loosening of the wrapping can be prevented. Further, in the heat-sealing method which uses a heated metallic plate, the heat is not readily transmitted to the underside of the heated surface due to the greatness of the apparent thickness of the instant binding strap when the strapping of boxed or crated goods is performed, with the consequence that the possibility of stretching or breaking of the strap as a result of the softening of those parts other than where the strap is secured is remote.

The binding strap of the present invention, such as hereinbefore described, can be manufactured by a new and advantageous process which includes the conventional process consisting of extrusion molding a relatively narrow and flat band from a starting material consisting predominantly of a thermoplastic synthetic resin having good crystal orientating tendency, cooling the extruded band, then stretching the band to a high degree in its extrusion direction, and thereafter forming concavities and convexities on the front and back sides of the band by means of a pair of pressure rolls whose surfaces have been engraved with concavities and convexities, with which process are combined the following four characteristic conditions, namely:

a. The use, as the pressure rolls, of a set consisting of a roll 4 whose surface has been engraved in relief with parallel ridges 6 and parallel ridges 7, which two sets of ridges are intersectingly disposed, obliquely, and a roll 5 whose surface has been engraved in relief with parallel ridges 6' and parallel ridges 7', which two sets of ridges are likewise intersectingly disposed obliquely;

b. The two rolls 4 and 5 are so set up that the ridges 6, 7 of the former and the ridges 7', 6' of the latter are constantly in register;

c. The rolls 4 and 5, such as described, form in register at the front and back sides of the strap 1, as shown in sectional configuration in FIG. 1, a multiplicity of parallel grooves 2 and a multiplicity of parallel grooves 3, which are intersectingly disposed obliquely, with the proviso that in forming the grooves by compression of the band the width of the band is not spread out in excess of 10 percent, the spread preferably being within the range of 2 to 5 percent; and d. Distribution in reticulate fashion over the whole of the strap of those grooved portions in which a substantial decrease has taken place in the state of crystal orientation in the stretching direction.

According to the process, for making the binding straps of the present invention in carrying out the compression of the extruded and stretched band with pressure rolls having concavo-convex surfaces, the compression of the band is not carried out by means of randomly scattered projections as in the case with the conventional processes but is accomplished by means of a pair of rolls which are set up to rotate in such a manner that the ridges 6, 7 of roll 4 and ridges 7', 6' of roll 5 are constantly in register. Further, since the grooves are intersectingly disposed obliquely relative to the direction of the roll axes, the compression is not carried out in parallel to the stretching direction. For these reasons, the pressure points are compressed from both the front and back sides of the band in continuous alignment obliquely to the axis of stretching, with the consequence that the dispersion of minute cracks over the band is effectively prevented. Further, it is an important requisite in the instant process that an increase in the width of the band in excess of 10 percent does not occur. This requisite automatically determines the compression force and the extent of the decrease in thickness at the portions of the grooves 2, 3. In consequence of the application of a compression such as described, a concavo-convex pattern is formed on the front and back sides of the resulting strap and at the same time the state of crystal orientation in the stretching direction is substantially decreased at the portions of the grooves 2, 3 to substantially increase the resistance to longitudinal split in these portions and to provide the strap 1, with portions of high resistance to longitudinal splits distributed in reticulate fashion over the whole of the strap.

Now, if the increase in the width of the band is completely checked in carrying out the compression, either the compression becomes inadequate or, even though the compression is accomplished, there is a marked movement of the starting material to the uncompressed convex portions, and hence it becomes impossible to provide the strap 1 with the desired properties. On the other hand, when the increase in the width of the band by means of compression is excessive, the tensile strength of the strap 1 in the longitudinal direction declines and the strap becomes easily stretched. Hence, a binding strap suitable for heavy duty service cannot be obtained.

It is an indispensable requirement in the case of the process of the present invention to achieve a thorough compression of the grooved portions 2, 3 of the strap 1 while ensuring that the grooves 2, 3 on the front and back sides of the strap are in register, this bein accomplished by setting up the two rolls in such a manner that the ridges 6, 7 of roll 4 and the ridges 7', 6' of the roll 5 are constantly in register. However, in carrying out the compression of the band continuously with the pair of rolls 4 and 5 it is difficult to drive the rolls so that their respective ridges are constantly in precise register. This is especially true when the end of the band is to be inserted between the two rolls in starting the compression operation. The operation of accomplishing the precise register of the respective ridges is an exceedingly troublesome task. To repeat this every time the operation is interrupted and to produce a strap of a given quality on each occasion is indeed a tedious task.

The present invention provides an apparatus which can solve the foregoing difficulties that are involved in the manufacture of a binding strap. The invention apparatus is characterized in that in order to achieve the cooperative driving of the pair of pressure rolls with the multiplicity of parallel ridges engraved on the roll surfaces constantly in register a pair of gears, which are in constant engagement, are provided at the extended portions of roll shafts, the bearings for one of the rolls are movably mounted, and to ensure that the gears are secured in their engaged state a thrust type universal joint is provided for coupling the gear for movable roll with its bearing part. More specifically, the invention apparatus is characterized in that in a apparatus for manufacturing binding straps, which is made up of a pair of pressure rolls, i. Of the two rolls, one is the stationary roll 4 and the other is the movable roll 5, the movable roll 5 being journalled by means of movable bearings 8, 8', which are adapted to variably set the clearance between the two rolls optionally;

ii. The surface of the roll 4 has engraved thereon in relief parallel ridges 6 and parallel ridges 7, which two sets of ridges are intersectingly disposed obliquely, while the surface of the roll 5 has engraved thereon in relief parallel ridges 6' and parallel ridges 7', which two sets of ridges are likewise intersectingly disposed obliquely;

iii. The two rolls by having been provided at the extended portions of their respective shafts with gears 9 and 10, which are in engagement, are adapted to be cooperatively driven with the ridges 6, 7 of one of the rolls constantly in register with the ridges 7', 6' of the other roll;

iv. The aforesaid movable bearing 8 of the shaft of the movable pressure roll 5 and the gear 10 is coupled by means of a thrust type universal joint shaft 11.

The invention apparatus will now be described more specifically with reference to the accompanying drawings. The stationary pressure roll 4 is journaled in pillow blocks 12 provided atop a bench. On the other hand, the movable pressure roll 5 is journaled in movable bearings 8, 8' above the roll 4. Rolls 4 and 5 are coupled by means of the engagement of gears 9, 10 provided at the extended portions of the rotating shafts of the two rolls, the ends of the shafts carrying these gears being journaled in bearings 14, 14', 15, 15' secured in a support 13. In the case of the rotating shaft of the movable pressure roll 5, that portion between the movable bearing 8 and the gear 10 is coupled by means of a thrust type universal joint shaft 11. The movable bearings 8, 8' are moved vertically by means of forwarding screws 16, 16' provided in an arm 17 extending laterally above the rolls 4, 5 from the aforesaid support 13. Since the gear 10 is fixed in this case, the thrust type universal joint shaft 11 bends by means of the action of the universal joint and extends at the same time by means of its thrust action and, as a consequence, the interval between the roll 4 and roll 5 can be readily widened or narrowed. Now, the forwarding screws 16, 16' of the movable bearings 8, 8' are secured rotatably at their upper ends to the arm 17 and pass therethrough to engage worm gears 18, which in turn, are in engagement with worms 20 mounted on a shaft 19, which is disposed extending through the arm 17. The end of the shaft 19 is provided with a handle 21 by which the shaft 19 is turned to thereby cause the vertical movement of the movable bearins 8, 8'. The stationary roll 4 is driven through the intermediary of a belt 23 by a motor mounted at below the bench.

Since the invention apparatus is as above described, once the ridges 6, 7 engraved in relief in the surface of roll 4 and ridges 7', 6' engraved in relief in the surface of roll 5 are set precisely in register, it does not slip out of register thereafter. Furthermore, not only can the clearance between the rolls be very readily enlarged when enclasping a band between the rolls, but also the degree of compression can be very readily adjusted by an adjustment of the roll clearance. Hence, when use is made of the invention apparatus, the hereinbefore described invention binding straps can be readily obtained with good quality, since the invention process can be carried out with certainty by the use of this apparatus.

The following examples are given for more specifically illustrating the invention.

EXAMPLE I 97.5 parts by weight of isotactic polypropylene and 2.5 parts by weight of calcium carbonate powder were charged to an extruder having a cylinder 50 mm in diameter and heat-melted and kneaded therein, followed by extrusion from a T-die of 50mm width and lip clearance of 1.5 mm to form a band, which was immediately cooled with cooling water. Next, this band was stretched about 7X with a pair of stretching rolls made up of two sets of rolls, while immersed in 95°C. hot water. Thus, a stretched band having a width of 11.5 mm and thickness of 0.63 mm was obtained. Since this band has been drawn in the direction of its extrusion only, it is highly susceptible to longitudinal splits.

This band was then nipped between a pair of rolls 100 mm in diameter and having engraved in their surfaces two sets of paralel ridges intersecting obliquely at an angle of 60° to the roll axis, whereby compression was applied to both surfaces of the band. The rolls were then rotatingly driven with the ridges engraved in each surface of the rolls constantly in register with one another by means of a pair of gears provided at the entended portions of the roll shafts and in engagement with each other. The width of the crest of ridges was 0.5 mm in this case and the pitch was 2 mm.

Thus, as can be appreciated from a consideration of the sectional configuration shown in FIG. 1, a binding strap having grooves disposed in reticulate fashion, the front and back sides of which are in exact register and the ridge portion of which is 12.0 mm in width and 0.8 mm in thickness, was obtained. When comparisons were made of the band before and after its compression, the increase in the width was 4.3 percent, while the increase in the maximum thickness was 27 percent. This strap was highly resistant to the formation of longitudinal splits. And when this strap was examined with a 15X magnifier, the presence of minute cracks could not be seen at all. The tensile strength of this strap was 260 kg (280 kg before compression), and its elongation at break was 20 percent. Further, its heatseal strength obtained with an automatic packaging machine was 205 kg.

EXAMPLE II

A great number of straps were obtained by operating exactly as in Example I, except that the degree of compression applied was varied by changing the clearance between the pressure rolls. These straps were divided into four groups A – D depending upon the degree of compression applied. The properties of these straps are tabulated below.

| Group | Properties | | | |
|---|---|---|---|---|
| | Width Increase (%) | Increase in Maximum Thickness (%) | Decrease in Breaking Strength (%) | Longitudinal Splitting |
| A | 0 – 2 | 0 – 15 | 0 – 5 | Some tendency to splitting |
| B | 2 – 6 | 15 – 70 | 5 – 30 | Great resistance to splitting |
| C | 6 – 10 | 70 – 90 | 30 – 60 | Does not split |
| D | 10 – 15 | 90 – 120 | 60 – 95 | do |

The pressure roll used in this experiment was one having grooves of sufficient depth that the material would move to the grooved portion without any limitation to finally result in the thickness of the compressed portion of the band becoming so thin that breakage occurs as the degree of the compression is raised. Hence, in the case of the straps of group D, the compressed portion became so thin that these straps, though splits did not appear, were of no practical use. The straps of group B were the most desirable.

Further, the correlation between the rate of increase in width and that of the maximum thickness changes depending upon the difference in the thickness of the original band (untreated band). When the original thickness is great, it is observed that there is a greater change in the rate of width increase than that of the increase in maximum thickness.

Further, since the movement of the material to the groove portion is restricted when the compression is carried out with a pressure roll having shallow grooves, the width increase of the band is extremely great and hence is undesirable when such a roll is used and an excessive compression is carried out on an untreated band whose original thickness is great.

What is claimed is:

1. In the process for the manufacture of a binding strap including the steps of extrusion molding a narrow and flat band from a starting material consisting predominantly of a thermoplastic synthetic resin having good crystal orientating tendency, cooling the extruded band, stretching the band to a high degree in the extrusion direction, and thereafter forming concavities and convexities in the front and back sides of the band by means of a set of pressure rolls having surfaces engraved with concavities and convexities, the improvement which comprises engraving in relief each of the pressure rolls with a first multiplicity of parallel ridges and a second multiplicity of parallel ridges, said first and second multiplicity of parallel ridges being intersectingly disposed obliquely with respect to each other, setting up said pressure rolls so that the first and second multiplicity of parallel ridges are constantly in register with the first and second multiplicity of parallel ridges of each other roll, and compressing the band with said rolls in such a manner that the width of the band is not increased in excess of 10%, thereby forming in register at the front and back sides of said strap a first multiplicity of parallel grooves and a second multiplicity of parallel grooves corresponding to said first and second multiplicity of parallel ridges, which are intersectingly disposed obliquely with respect to each other, to distribute reticulately over the whole of said strap a plurality of intersecting, obliquely disposed parallel groove portions wherein the state of crystal orientation in said groove portions in the machine direction of said strap has been reduced.

* * * * *